United States Patent
Graziosi et al.

(10) Patent No.: US 12,183,045 B2
(45) Date of Patent: Dec. 31, 2024

(54) MESH PATCH SIMPLIFICATION

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: Sony Group Corporatiom, Tokyo (JP); Sony Corporation of America, NY (US)

( * ) Notice: Subject to any disclaimer, the term of this patent is extended or adjusted under 35 U.S.C. 154(b) by 140 days.

(21) Appl. No.: 17/987,841

(22) Filed: Nov. 15, 2022

(65) Prior Publication Data

US 2023/0306643 A1    Sep. 28, 2023

Related U.S. Application Data

(60) Provisional application No. 63/269,909, filed on Mar. 25, 2022.

(51) Int. Cl.
*G06T 9/00* (2006.01)

(52) U.S. Cl.
CPC .................. *G06T 9/001* (2013.01)

(58) Field of Classification Search
CPC ........................................ G06T 9/001
See application file for complete search history.

(56) References Cited

U.S. PATENT DOCUMENTS

2010/0277476 A1* 11/2010 Johansson ............... G06T 17/20
  345/423
2013/0024545 A1*  1/2013 Sheppard ....... H04N 21/234318
  709/217
2016/0371891 A1 12/2016 Kim

OTHER PUBLICATIONS

Yalan Mao, Jie Yang, Bangpei Zhu, and Yi Yang, A New Mesh Simplification Algorithm based on Quadric Error Metric, 2015, IEEE, In 2015 IEEE 5th International Conference on Consumer Electronics—Berlin (ICCE—Berlin), pp. 463-466. (Year: 2015).*
Lili Wang, Zhiqiang Ma, Bing Xue, and Zhe Shen, Simplification for Texture Mapping Models With Mesh Segmentation, 2010, IEEE, In 2010 16th International Conference on Virtual Systems and Multimedia (VSMM), pp. 197-203. (Year: 2010).*

(Continued)

*Primary Examiner* — Jeffery A Brier
(74) *Attorney, Agent, or Firm* — Haverstock & Owens, A Law Corporation

(57) ABSTRACT

Ways to simplify connectivity data for patches are described herein. The patches are generated considering the high-resolution mesh information. The connectivity data is simplified at the patch level, while the geometry image is still preserved. For the connectivity simplification, only triangles inside the patch are simplified. If the border is still preserved, the reconstruction in 3D will not suffer from artifacts. The high-resolution geometry image can be used to reverse the simplification and improve the connectivity at the decoder side. Three embodiments of patch mesh simplification are described: quadric error edge collapse, border distance edge collapse, and border triangles only.

17 Claims, 4 Drawing Sheets

(56) References Cited

OTHER PUBLICATIONS

Martin Isenburg, Peter Lindstrom, Stefan Gumhold, and Jack Snoeyink, Large Mesh Simplification using Processing Sequences, 2003, IEEE, In IEEE Visualization 2003, Proceedings of the 14th IEEE Visualization Conference (VIS'03), pp. 465-472. (Year: 2003).*

Danillo Graziosi (Sony) et al: "[V-CG]Sony's Dynamic Mesh Coding Call for Proposal Response", 138. MPEG Meeting; Apr. 25, 2022-Apr. 29, 2022;Online; No. m59284, Apr. 24, 2022 (Apr. 24, 2022), XP030301436.

Garland M., et al., "Simplifying surfaces with color and texture using quadric error metrics", Visualization ,Proceeding Research Triangle Park, NC, USA Oct. 18-23, 1998,Piscataway, NJ. USA,IEEE, US, Oct. 18, 1998 (Oct. 18, 1998), pp. 263-269, 542, XP010321063.

Lili Wang et al: "Simplification for texture mapping models with mesh segmentation", Virtual Systems and Multimedia (VSMM), 2010 16th International Conference On,IEEE1 Piscataway, NJ, USA; Oct. 20, 2010 (Oct. 20, 2010), pp. 197-203, XP031833932,ISBN: 978-1-4244-9027-1 pp. 198-201, paragraph IIIB-paragraph V.

William J Schroeder et al: "Decimation of triangle meshes", Computer Graphics and Inteactive , Techniques, ACM, Jul. 1, 1992 (Jul. 1, 1992), pp. 65-70, XP058086453.

* cited by examiner

MESH PATCH SIMPLIFICATION

CROSS-REFERENCE TO RELATED APPLICATION(S)

This application claims priority under 35 U.S.C. § 119(e) of the U.S. Provisional Patent Application Ser. No. 63/269,909, filed Mar. 25, 2022 and titled, "MESH PATCH SIMPLIFICATION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

Ways to simplify connectivity data for patches are described herein. At first, the patches are generated considering the high-resolution mesh information. The connectivity data is simplified at the patch level, while the geometry image is still preserved. For the connectivity simplification, only triangles inside the patch are allowed to be simplified. If the border is still preserved, the reconstruction in 3D will not suffer from artifacts, such as gaps between patches due to unmatched border vertices. The high-resolution geometry image can be used to reverse the simplification and improve the connectivity at the decoder side. Three embodiments of patch mesh simplification are described: quadric error edge collapse, border distance edge collapse, and border triangles only. The first two methods perform edge collapse but follow different criteria. The quadric error metric uses a 3D metric to check the possible distortion when moving the vertices and enforce triangle normal consistency and border preservation in the 2D projected space. For border distance, the criteria for edge collapse is the distance to borders, where the vertices that are most distant from the borders are collapsed first. Finally, the method to send only border triangles eliminates all the triangles that are not connected to borders and only sends the triangles that have at least one edge belonging to the border of the patch.

In one aspect, a method programmed in a non-transitory memory of a device comprises generating a patch and performing two dimensional patch mesh simplification to generate a new face list and a new vertex list. Performing the two dimensional patch mesh simplification comprises a quadric error edge collapse implementation. The quadric error edge collapse implementation includes a half-edge collapse based on a quadric error metric. Performing the two dimensional patch mesh simplification comprises a border distance edge collapse implementation. The border distance edge collapse implementation includes ordering a list of vertices according to a minimum distances to a border of the patch and collapsing a vertex with a neighboring vertex that is most distant to the border. Performing the two dimensional patch mesh simplification comprises a border triangles only implementation. The border triangles only implementation comprises rotating a triangle so a first edge of the triangle is at a border. The method further comprises implementing re-meshing at a decoder which includes marching cubes using border triangles and a decoded geometry video.

In another aspect, an apparatus comprises a non-transitory memory for storing an application, the application for: generating a patch and performing two dimensional patch mesh simplification to generate a new face list and a new vertex list and a processor coupled to the memory, the processor configured for processing the application. Performing the two dimensional patch mesh simplification comprises a quadric error edge collapse implementation. The quadric error edge collapse implementation includes a half-edge collapse based on a quadric error metric. Performing the two dimensional patch mesh simplification comprises a border distance edge collapse implementation. The border distance edge collapse implementation includes ordering a list of vertices according to a minimum distances to a border of the patch and collapsing a vertex with a neighboring vertex that is most distant to the border. Performing the two dimensional patch mesh simplification comprises a border triangles only implementation. The border triangles only implementation comprises rotating a triangle so a first edge of the triangle is at a border. The application is further configured for implementing re-meshing at a decoder which includes marching cubes using border triangles and a decoded geometry video.

In another aspect, a system comprises an encoder configured for: generating a patch and performing two dimensional patch mesh simplification to generate a new face list and a new vertex list and a decoder configured for: implementing re-meshing which includes marching cubes using border triangles and a decoded geometry video. Performing the two dimensional patch mesh simplification comprises a quadric error edge collapse implementation. The quadric error edge collapse implementation includes a half-edge collapse based on a quadric error metric. Performing the two dimensional patch mesh simplification comprises a border distance edge collapse implementation. The border distance edge collapse implementation includes ordering a list of vertices according to a minimum distances to a border of the patch and collapsing a vertex with a neighboring vertex that is most distant to the border. Performing the two dimensional patch mesh simplification comprises a border triangles only implementation. The border triangles only implementation comprises rotating a triangle so a first edge of the triangle is at a border.

DETAILED DESCRIPTION OF THE PREFERRED EMBODIMENT

Ways to simplify connectivity data for patches are described herein. At first, the patches are generated considering the high-resolution mesh information. The connectivity data is simplified at the patch level, while the geometry image is still preserved. For the connectivity simplification, only triangles inside the patch are allowed to be simplified. If the border is still preserved, the reconstruction in 3D will not suffer from artifacts, such as gaps between patches due to unmatched border vertices. The high-resolution geometry image can be used to reverse the simplification and improve the connectivity at the decoder side. Three embodiments of patch mesh simplification are described: quadric error edge collapse, border distance edge collapse, and border triangles only. The first two methods perform edge collapse but follow different criteria. The quadric error metric uses a 3D metric to check the possible distortion when moving the vertices and enforce triangle normal consistency and border preservation in the 2D projected space. For border distance, the criteria for edge collapse is the distance to borders, where the vertices that are most distant from the borders are collapsed first. Finally, the method to send only border triangles eliminates all the triangles that are not connected to borders and only sends the triangles that have at least one edge belonging to the border of the patch.

Figure 1:
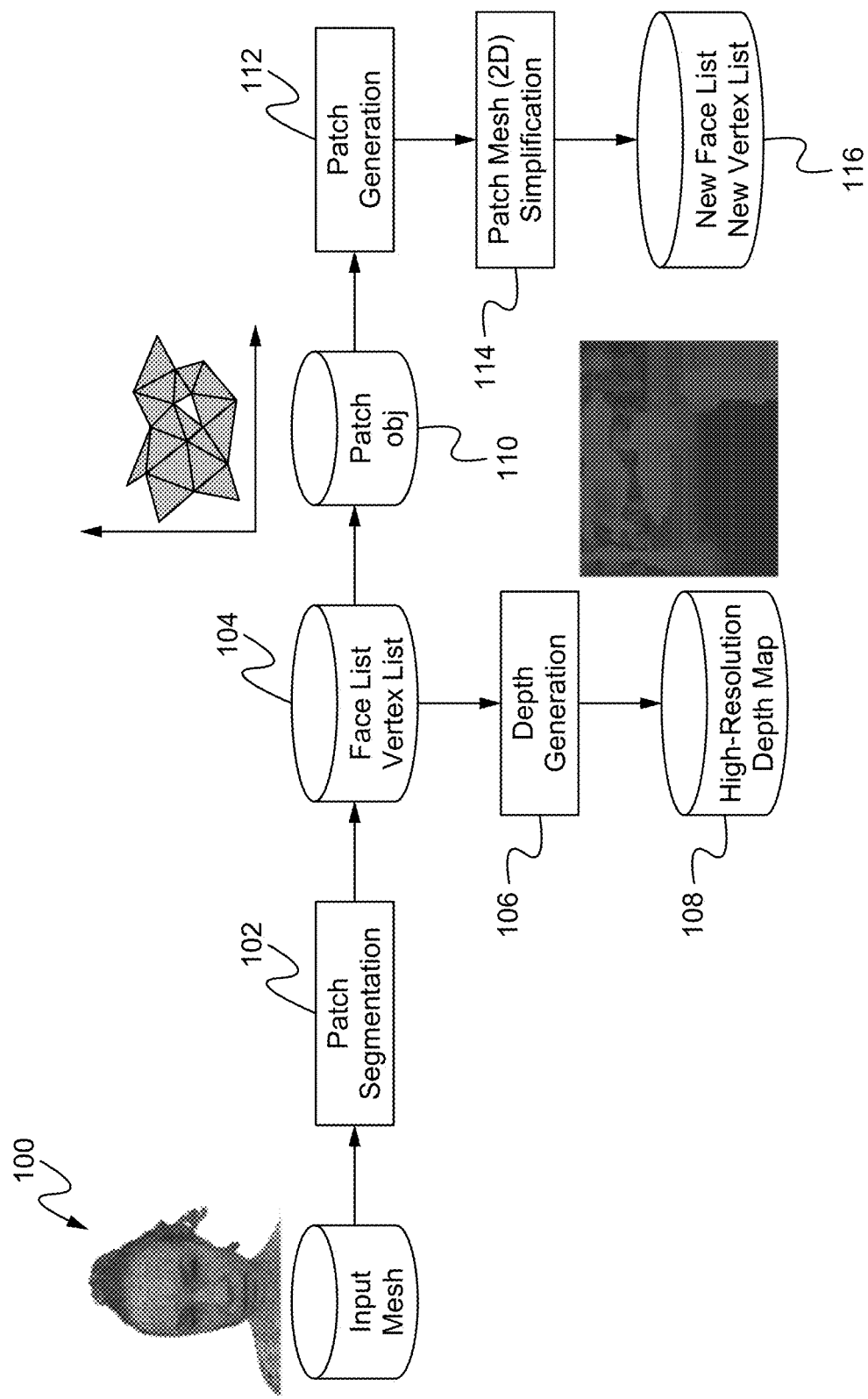
FIG. 1 illustrates a flowchart of a method of generating a new face list and a new vertex list according to some embodiments.

FIG. 1 illustrates a flowchart of a method of generating a new face list and a new vertex list according to some embodiments. In the step 100, an input mesh is received or acquired. For example, the input mesh is downloaded (e.g., from a network device) or acquired/captured by a device (e.g., camera or autonomous vehicle). In the step 102, the input mesh is segmented into patches. Any patch segmentation implementation is able to be performed. The patch segmentation generates a face list (e.g., connectivity) and a vertex list, in the step 104. In the step 106, depth generation is performed. In the step 108, a high-resolution depth map is generated based on the depth generation. In the step 110, patch obj enables an object to be regenerated using the face list and vertex list.

In the step 112, patch generation patch generation (or creation) is implemented. In some embodiments, patch generation includes: normal calculation, adjacency calculation, initial segmentation; refinement, patch projection, and patch rasterization. Normal calculation is calculating the normals of each triangle (e.g., cross product of the triangle's edges). Adjacency calculation involves calculating each triangle's adjacency (e.g., which triangles in the mesh neighbor or touch the current triangle or other triangles). Initial segmentation includes classifying the normal according to the orientation. For example, a normal of a triangle is able to point up, down, left, right, front, or back, and is able to be classified based on the direction/orientation. In some embodiments, the triangles are color-coded based on the orientation of their normals (e.g., all of the triangles with a normal pointing up are colored green). Refinement involves locating outliers (e.g., a single red triangle surrounded by blue triangles) and smoothing out the outliers (e.g., changing the single red triangle to match its neighbors which are blue). The refinement is performed by analyzing the neighbors and smoothing the orientation (e.g., adjusting the orientation of the normal). Once there is a smooth surface, then patch projection is performed which involves projecting the patches for a specific classification of triangles (e.g., based on orientation). With the projection, the vertices and connectivity are shown on the patches. For example, the body and face in this example are separate projections since there are triangles with different classifications separating the two. V3C and V-PCC do not understand this though; rather, V3C and V-PCC understand points, so the projection is rasterized (e.g., sampling points on the surface including the distance of the points to generate a geometry image and the attributes of the surface). The rasterized mesh surface is very similar to a V3C image. The steps 100 through 112 are able to be performed in any standard implementation.

In the step 114, patch mesh (2D) simplification is performed on the generated patches. Patch mesh (2D) simplification reduces amount of data sent (e.g., encoded). However, the data sent is enough to recover the mesh. As described herein, there are three different implementations for patch mesh (2D) simplification: quadric error edge collapse, border distance edge collapse, and border triangles only. In the step 116, a new face list and a new vertex list are generated based on the patch mesh (2D) simplification, which are sent/encoded. In some embodiments, fewer or additional steps are implemented. For example, a decoder is able to be implemented to decode the patch mesh. In some embodiments, the order of the steps is modified.

Figure 2:
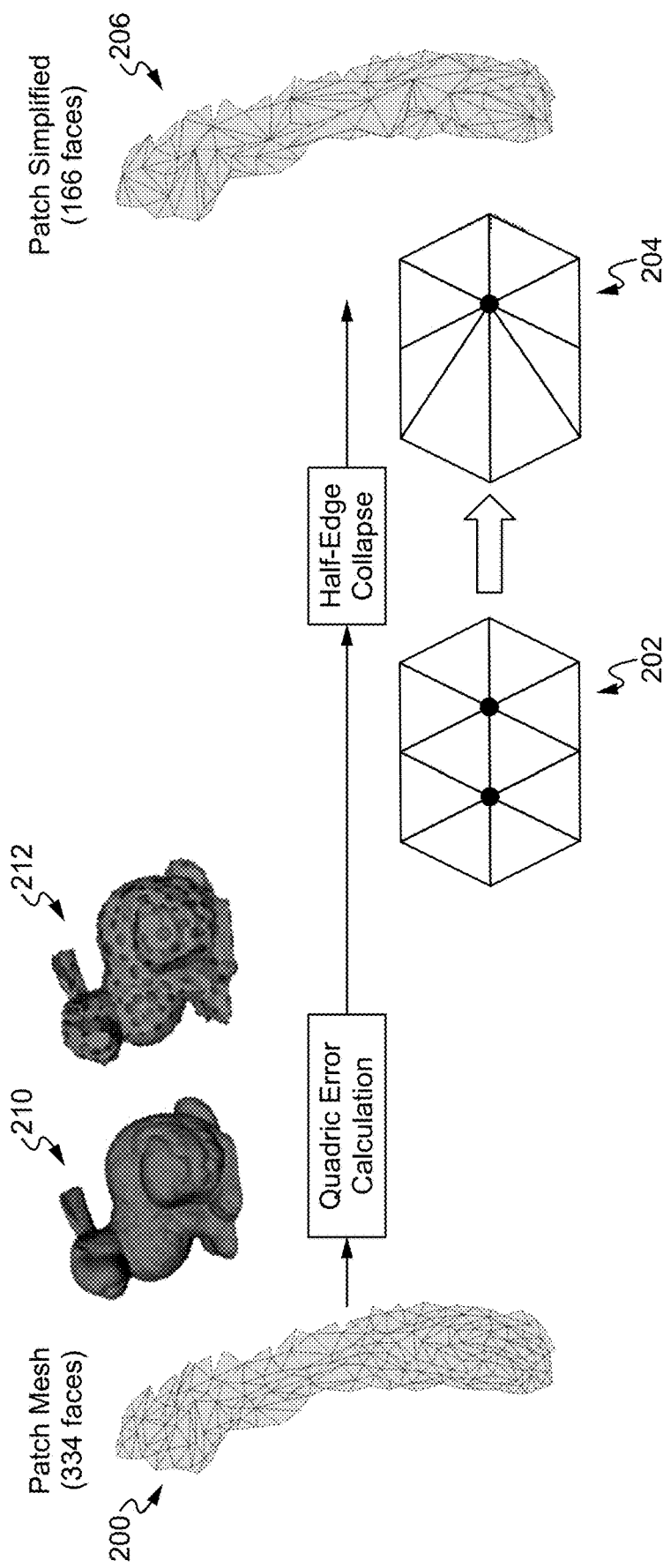
FIG. 2 illustrates a diagram of quadric error collapse according to some embodiments.

FIG. 2 illustrates a diagram of quadric error collapse according to some embodiments. An original patch mesh 200 has 334 faces. Using a quadric error calculation, a quadric error metric is able to be determined.

The quadric error matrix of a vertex $v_i(QM_v)$ is obtained in the following way:

$$QM_{vi} = \sum_{j \in N_i} QM_{tj}$$

where $N_i$ is the set of triangles that contain the vertex i. The quadric error matrix for a triangle with vertices $(V_A, v_B, V_C)$ is calculated in the following way:

$$\vec{A}B = V_B - V_A =$$

$$\vec{A}c = V_C - V_A =$$

$$\vec{N} = \vec{A}B \times \vec{A}C$$

$$d = v_A * \vec{N}$$

$$A = \vec{N} \times \vec{N}^T$$

$$B = -2 * d * \vec{N}$$

$$c = d * d$$

$$QM_{tj} = (A, B, c)$$

Then, the cost of moving a vertex $v_i$ to a position $v_j$ is given by the formula:

$$cost = QM_{vi}(v_j) = v_j * A * v_j^T + B * v_j^T + c$$

Based on the quadric error metric, a half-edge collapse is able to be implemented. As shown, original connectivity 202 is able to be collapsed into connectivity 204 with fewer points. The simplified patch 206 has 166 faces compared to the 334 faces of the original patch mesh 200. The simplified patch 206 preserves the vertices around the patch (e.g., the outer edge vertices), but the triangles inside are organized differently than the original patch mesh. The full original mesh 210 is also shown in comparison with the full simplified mesh 212. By having fewer faces (and due to fewer vertices), there is much less data to encode.

Figure 3:
FIG. 3 illustrates an image of a mesh with only border triangles sent according to some embodiments.

FIG. 3 illustrates an image of a mesh with only border triangles sent according to some embodiments. Only triangles at a border are kept. To know which triangles are at the border, a triangle is rotated so that the first edge of the triangle is the one at the border. If more than one edge is at the border, then more than one triangle is sent. If a triangle does not have any edges at the border, then the triangle is not sent. On the decoder side, re-meshing is implemented which includes using marching cubes using the border triangles and the decoded geometry video. The geometry video indicates where the surface should be, then marching cubes are performed on the surface to regenerate the triangles. When doing marching cubes, the process begins with the border triangles that were already sent.

Figure 4:
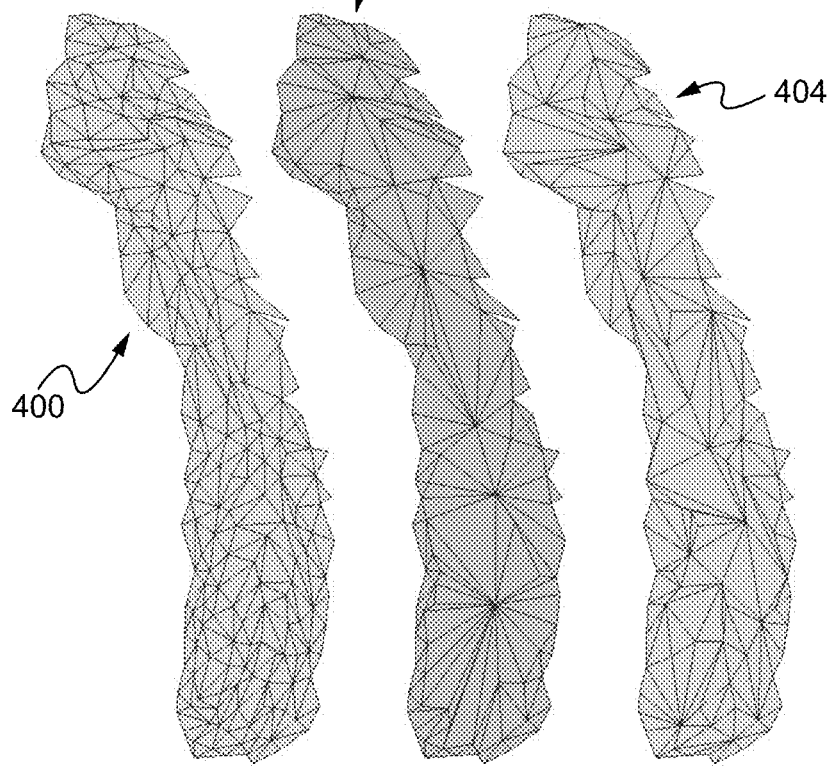
FIG. 4 illustrates a diagram of boundary distance edge collapse according to some embodiments.

FIG. 4 illustrates a diagram of boundary distance edge collapse according to some embodiments. Edge collapse is able to be based on the distance to the border. A list of vertices is able to be ordered according to their minimum distance to the patch's border. A vertex is collapsed with the neighbor that is the most distant to the border. This implementation is coded more efficiently, but Peak Signal-to-Noise Ratio (PSNR) is lower. A vertex split implementation is able to be used to improve PSNR.

The vertices on the border are decoded well because zippering is able to be used to restore the border. In terms of video compression, the points that are in the middle of the patch might have fewer artifacts than the points on the border since the points in the middle are typically on a smoother area.

As shown, the initial patch mesh 400 has 334 faces, but the patch mesh using border distance edge collapse 402 has 166 faces, which has the same or a similar number of faces (e.g., 166) as the quadric error implementation 404.

Figure 5:
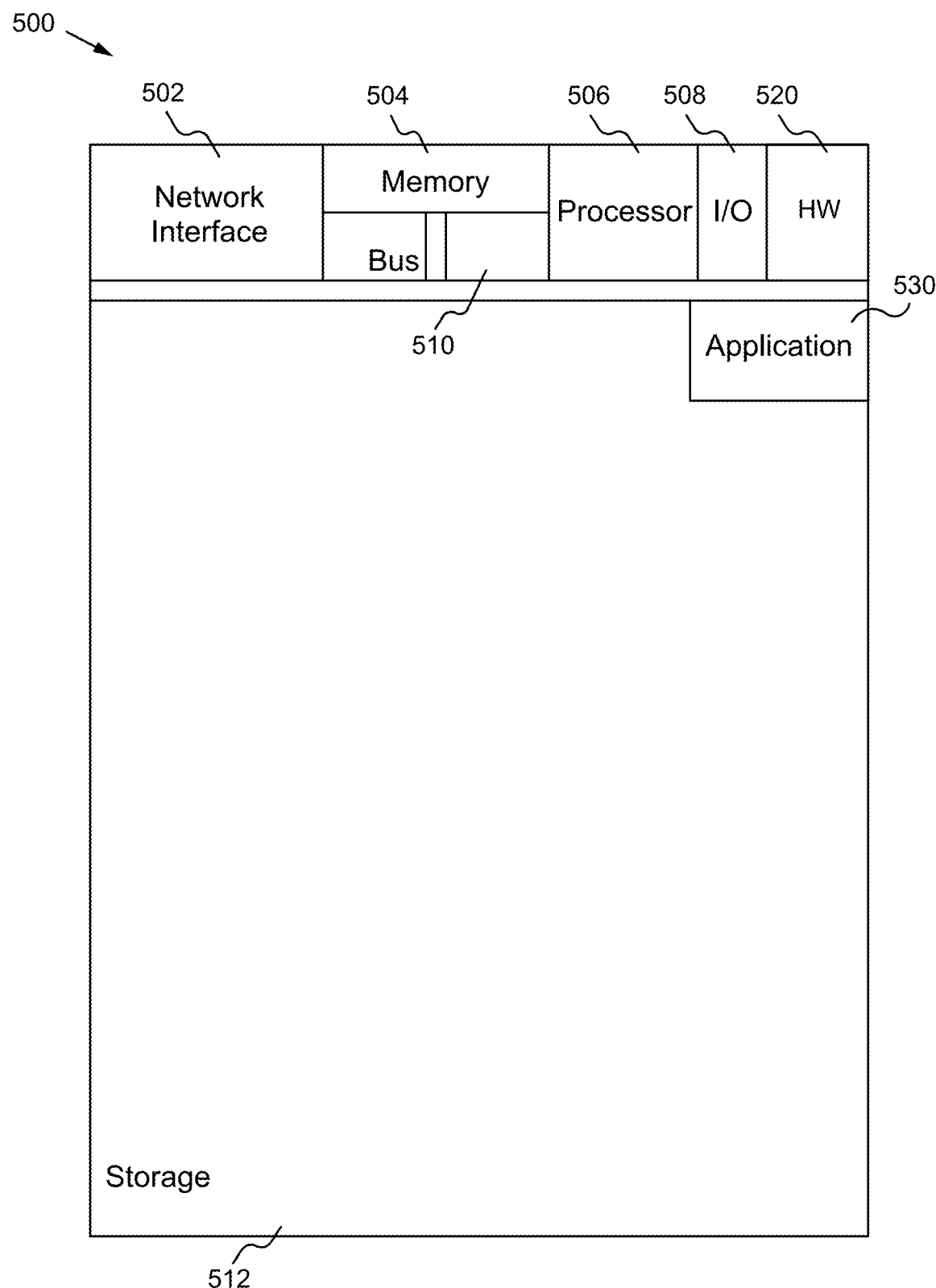
FIG. 5 illustrates a block diagram of an exemplary computing device configured to implement the mesh patch simplification method according to some embodiments.

FIG. 5 illustrates a block diagram of an exemplary computing device configured to implement the mesh patch simplification method according to some embodiments. The computing device 500 is able to be used to acquire, store, compute, process, communicate and/or display information such as images and videos including 3D content. The computing device 500 is able to implement any of the encoding/decoding aspects. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Mesh patch simplification application(s) 530 used to implement the mesh patch simplification implementation are likely to be stored in the storage device 512 and memory 504 and processed as applications are typically processed. More or fewer components shown in FIG. 5 are able to be included in the computing device 500. In some embodiments, mesh patch simplification hardware 520 is included. Although the computing device 500 in FIG. 5 includes applications 530 and hardware 520 for the mesh patch simplification implementation, the mesh patch simplification method is able to be implemented on a computing device in hardware, firmware, software or any combination thereof. For example, in some embodiments, the mesh patch simplification applications 530 are programmed in a memory and executed using a processor. In another example, in some embodiments, the mesh patch simplification hardware 520 is programmed hardware logic including gates specifically designed to implement the mesh patch simplification method.

In some embodiments, the mesh patch simplification application(s) 530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the mesh patch simplification method, a device acquires or receives 3D content (e.g., point cloud content). The mesh patch simplification method is able to be implemented with user assistance or automatically without user involvement.

In operation, the mesh patch simplification method enables more efficient and more accurate 3D content encoding compared to previous implementations.

Some Embodiments of Mesh Patch Simplification

1. A method programmed in a non-transitory memory of a device comprising:
   generating a patch; and
   performing two dimensional patch mesh simplification to generate a new face list and a new vertex list.
2. The method of clause 1 wherein performing the two dimensional patch mesh simplification comprises a quadric error edge collapse implementation.
3. The method of clause 2 wherein the quadric error edge collapse implementation includes a half-edge collapse based on a quadric error metric.
4. The method of clause 1 wherein performing the two dimensional patch mesh simplification comprises a border distance edge collapse implementation.
5. The method of clause 4 wherein the border distance edge collapse implementation includes ordering a list of vertices according to a minimum distances to a border of the patch and collapsing a vertex with a neighboring vertex that is most distant to the border.
6. The method of clause 1 wherein performing the two dimensional patch mesh simplification comprises a border triangles only implementation.
7. The method of clause 6 wherein the border triangles only implementation comprises rotating a triangle so a first edge of the triangle is at a border.
8. The method of clause 6 further comprising implementing re-meshing at a decoder which includes marching cubes using border triangles and a decoded geometry video.
9. An apparatus comprising:
   a non-transitory memory for storing an application, the application for:
   generating a patch; and
   performing two dimensional patch mesh simplification to generate a new face list and a new vertex list; and
   a processor coupled to the memory, the processor configured for processing the application.
10. The apparatus of clause 9 wherein performing the two dimensional patch mesh simplification comprises a quadric error edge collapse implementation.
11. The apparatus of clause 10 wherein the quadric error edge collapse implementation includes a half-edge collapse based on a quadric error metric.
12. The apparatus of clause 9 wherein performing the two dimensional patch mesh simplification comprises a border distance edge collapse implementation.
13. The apparatus of clause 12 wherein the border distance edge collapse implementation includes ordering a list of vertices according to a minimum distances to a border of the patch and collapsing a vertex with a neighboring vertex that is most distant to the border.
14. The apparatus of clause 9 wherein performing the two dimensional patch mesh simplification comprises a border triangles only implementation.
15. The apparatus of clause 14 wherein the border triangles only implementation comprises rotating a triangle so a first edge of the triangle is at a border.
16. The apparatus of clause 14 wherein the application is further configured for implementing re-meshing at a decoder which includes marching cubes using border triangles and a decoded geometry video.
17. A system comprising:
   an encoder configured for:
   generating a patch; and
   performing two dimensional patch mesh simplification to generate a new face list and a new vertex list; and
   a decoder configured for:
   implementing re-meshing which includes marching cubes using border triangles and a decoded geometry video.
18. The system of clause 17 wherein performing the two dimensional patch mesh simplification comprises a quadric error edge collapse implementation.
19. The system of clause 18 wherein the quadric error edge collapse implementation includes a half-edge collapse based on a quadric error metric.
20. The system of clause 17 wherein performing the two dimensional patch mesh simplification comprises a border distance edge collapse implementation.
21. The system of clause 20 wherein the border distance edge collapse implementation includes ordering a list of vertices according to a minimum distances to a border of the patch and collapsing a vertex with a neighboring vertex that is most distant to the border.
22. The system of clause 17 wherein performing the two dimensional patch mesh simplification comprises a border triangles only implementation.
23. The system of clause 22 wherein the border triangles only implementation comprises rotating a triangle so a first edge of the triangle is at a border.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   generating a patch; and
   performing two dimensional patch mesh simplification to generate a new face list and a new vertex list, wherein performing the two dimensional patch mesh simplification comprises a border triangles only implementation, wherein the border triangles only implementation comprises rotating a triangle so a first edge of the triangle is at a border.
2. The method of claim 1 wherein performing the two dimensional patch mesh simplification comprises a quadric error edge collapse implementation.

3. The method of claim 2 wherein the quadric error edge collapse implementation includes a half-edge collapse based on a quadric error metric.

4. The method of claim 1 wherein performing the two dimensional patch mesh simplification comprises a border distance edge collapse implementation.

5. The method of claim 4 wherein the border distance edge collapse implementation includes ordering a list of vertices according to a minimum distances to a border of the patch and collapsing a vertex with a neighboring vertex that is most distant to the border.

6. The method of claim 1 further comprising implementing re-meshing at a decoder which includes marching cubes using border triangles and a decoded geometry video.

7. An apparatus comprising:
a non-transitory memory for storing an application, the application for:
generating a patch; and
performing two dimensional patch mesh simplification to generate a new face list and a new vertex list, wherein performing the two dimensional patch mesh simplification comprises a border triangles only implementation, wherein the border triangles only implementation comprises rotating a triangle so a first edge of the triangle is at a border; and
a processor coupled to the memory, the processor configured for processing the application.

8. The apparatus of claim 7 wherein performing the two dimensional patch mesh simplification comprises a quadric error edge collapse implementation.

9. The apparatus of claim 8 wherein the quadric error edge collapse implementation includes a half-edge collapse based on a quadric error metric.

10. The apparatus of claim 7 wherein performing the two dimensional patch mesh simplification comprises a border distance edge collapse implementation.

11. The apparatus of claim 10 wherein the border distance edge collapse implementation includes ordering a list of vertices according to a minimum distances to a border of the patch and collapsing a vertex with a neighboring vertex that is most distant to the border.

12. The apparatus of claim 7 wherein the application is further configured for implementing re-meshing at a decoder which includes marching cubes using border triangles and a decoded geometry video.

13. A system comprising:
an encoder configured for:
generating a patch; and
performing two dimensional patch mesh simplification to generate a new face list and a new vertex list, wherein performing the two dimensional patch mesh simplification comprises a border triangles only implementation, wherein the border triangles only implementation comprises rotating a triangle so a first edge of the triangle is at a border; and
a decoder configured for:
implementing re-meshing which includes marching cubes using border triangles and a decoded geometry video.

14. The system of claim 13 wherein performing the two dimensional patch mesh simplification comprises a quadric error edge collapse implementation.

15. The system of claim 14 wherein the quadric error edge collapse implementation includes a half-edge collapse based on a quadric error metric.

16. The system of claim 13 wherein performing the two dimensional patch mesh simplification comprises a border distance edge collapse implementation.

17. The system of claim 16 wherein the border distance edge collapse implementation includes ordering a list of vertices according to a minimum distances to a border of the patch and collapsing a vertex with a neighboring vertex that is most distant to the border.

\* \* \* \* \*